(12) United States Patent
Chinen et al.

(10) Patent No.: US 10,109,285 B2
(45) Date of Patent: Oct. 23, 2018

(54) CODING DEVICE AND METHOD, DECODING DEVICE AND METHOD, AND PROGRAM

(71) Applicant: Sony Corporation, Tokyo (JP)

(72) Inventors: Toru Chinen, Kanagawa (JP); Mitsuyuki Hatanaka, Kanagawa (JP); Minoru Tsuji, Chiba (JP); Hiroyuki Honma, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/508,286

(22) PCT Filed: Aug. 27, 2015

(86) PCT No.: PCT/JP2015/074132
§ 371 (c)(1),
(2) Date: Mar. 2, 2017

(87) PCT Pub. No.: WO2016/039150
PCT Pub. Date: Mar. 17, 2016

(65) Prior Publication Data
US 2017/0309278 A1     Oct. 26, 2017

(30) Foreign Application Priority Data

Sep. 8, 2014   (JP) .................................. 2014-182548

(51) Int. Cl.
*G10L 19/00* (2013.01)
*H04R 5/04* (2006.01)
(Continued)

(52) U.S. Cl.
CPC ............ *G10L 19/008* (2013.01); *G10L 19/03* (2013.01)

(58) Field of Classification Search
CPC ..... G10L 19/20; G10L 19/008; G10L 19/167; G10L 19/03; G10L 19/18; G10L 19/02;
(Continued)

(56) References Cited

U.S. PATENT DOCUMENTS 6,310,897 B1 * 10/2001 Watanabe ................ H04N 7/52
370/522
7,606,716 B2 * 10/2009 Kraemer ............... G10L 19/008
381/19

(Continued)

FOREIGN PATENT DOCUMENTS

JP     09-182036 A      7/1997
JP     2012-033243 A    2/2012
(Continued)

OTHER PUBLICATIONS

No Author Listed, Information technology—Coding of audio-visual objects—Part 3: Audio, International Standard, ISO/IEC 14496-3, Fourth edition Sep. 1, 2009, 1416 pages.

(Continued)

*Primary Examiner* — Thang Tran
(74) *Attorney, Agent, or Firm* — Wolf, Greenfield & Sacks, P.C.

(57) ABSTRACT

The present technology relates to a coding device and method, and a decoding device and method, and a program capable of reducing the amount of calculations for decoding. A separating unit separates a supplied bit stream into coded data of channel sources including a dialog source, coded data of additional data sources, and coded data of dialog information. A dialog information decoding unit decodes the coded data of the dialog information. When the dialog information acquired by the decoding is presented to a viewer, the viewer selects one source from the dialog source and some additional dialog sources. An additional dialog source decoding unit decodes only the coded data of an (Continued)

additional dialog source selected by the viewer. An additional dialog selection unit outputs a viewer-selected audio signal from among the audio signals of the dialog source and additional dialog sources in response to the selection instruction of the viewer. The present technology is applicable to coding devices and decoding devices.

16 Claims, 8 Drawing Sheets

(51) Int. Cl.
*H04S 3/00* (2006.01)
*G10L 19/008* (2013.01)
*G10L 19/03* (2013.01)

(58) Field of Classification Search
CPC ... G10L 19/0208; G10L 19/08; G10L 19/087; G10L 19/16; H04R 3/00; H04R 5/00; H04R 5/04; H04S 2400/15; H04S 2420/03; H04S 3/00
See application file for complete search history.

(56) References Cited

U.S. PATENT DOCUMENTS

| | | | |
|---|---|---|---|
| 2006/0106597 A1* | 5/2006 | Stein | G10L 19/20 704/203 |
| 2010/0017198 A1* | 1/2010 | Yamanashi | G10L 19/24 704/205 |
| 2010/0169081 A1* | 7/2010 | Yamanashi | G10L 19/0204 704/203 |
| 2011/0119054 A1* | 5/2011 | Lee | G10L 19/20 704/203 |
| 2012/0030253 A1 | 2/2012 | Katsumata | |
| 2012/0226496 A1* | 9/2012 | Yoon | G10L 19/06 704/219 |
| 2013/0202024 A1 | 8/2013 | Suzuki | |
| 2013/0287364 A1 | 10/2013 | Katsumata | |
| 2015/0334502 A1* | 11/2015 | Watanabe | H04S 3/00 381/300 |

FOREIGN PATENT DOCUMENTS

| | | |
|---|---|---|
| JP | 2014-142475 A | 8/2014 |
| WO | WO 2014/115222 A1 | 7/2014 |

OTHER PUBLICATIONS

No Author Listed, Information technology—MPEG audio technologies—Part 3: Unified speech and audio coding, ISO/IEC 23003-3, First edition Apr. 1, 2012, 286 pages.

Extended European Search Report dated Jan. 31, 2018 in connection with European Application No. 15839310.8.

Bleidt et al., Meeting the Requirements of Next-Generation Broadcast Television Audio, Fraunhofer NGBT Symp Paper Final, DVB, Digital Video Broadcasting, Oct. 20, 2011, XP017846847, 6 pages.

No Author Listed, Information technology—High efficiency coding and media delivery in hererogeneous environments—Part 3: 3D audio, ISO-IEC 23008-3 (E) (DIS of 3DA), DVB, Digital Video Broadcasting, ISO/IEC JTC 1/SC 229, 2014, XP017845569, 433 pages.

Schreiner et al., On multiple MPEG-H 3D Audio streams, MPEG Meeting, ISO/IEC JTC1/SC29/WG11, M34266, Jul. 2014, XP030062639, 6 pages.

* cited by examiner

FIG. 3

| Syntax | No. of Bits |
|---|---|
| dialogue_info_sync; | 16 |
| main_dialogue_info; | 24 |
|   dialogue_src_index; | 8 |
|   dialogue_gain; | 32 |
| num_additional_dialogue; | 4 |
| for(i=0; i<num_additional_dialogue; i++) { | |
|   additional_dialogue_info[i]; | 24 |
|   additional_dialogue_gain[i]; | 32 |
| } | |

FIG. 4

| Syntax | No. of Bits |
|---|---|
| additional_dialogue_data_sync;<br>additional_dialogue_index;<br>single_channel_element(); | 16<br>4 |

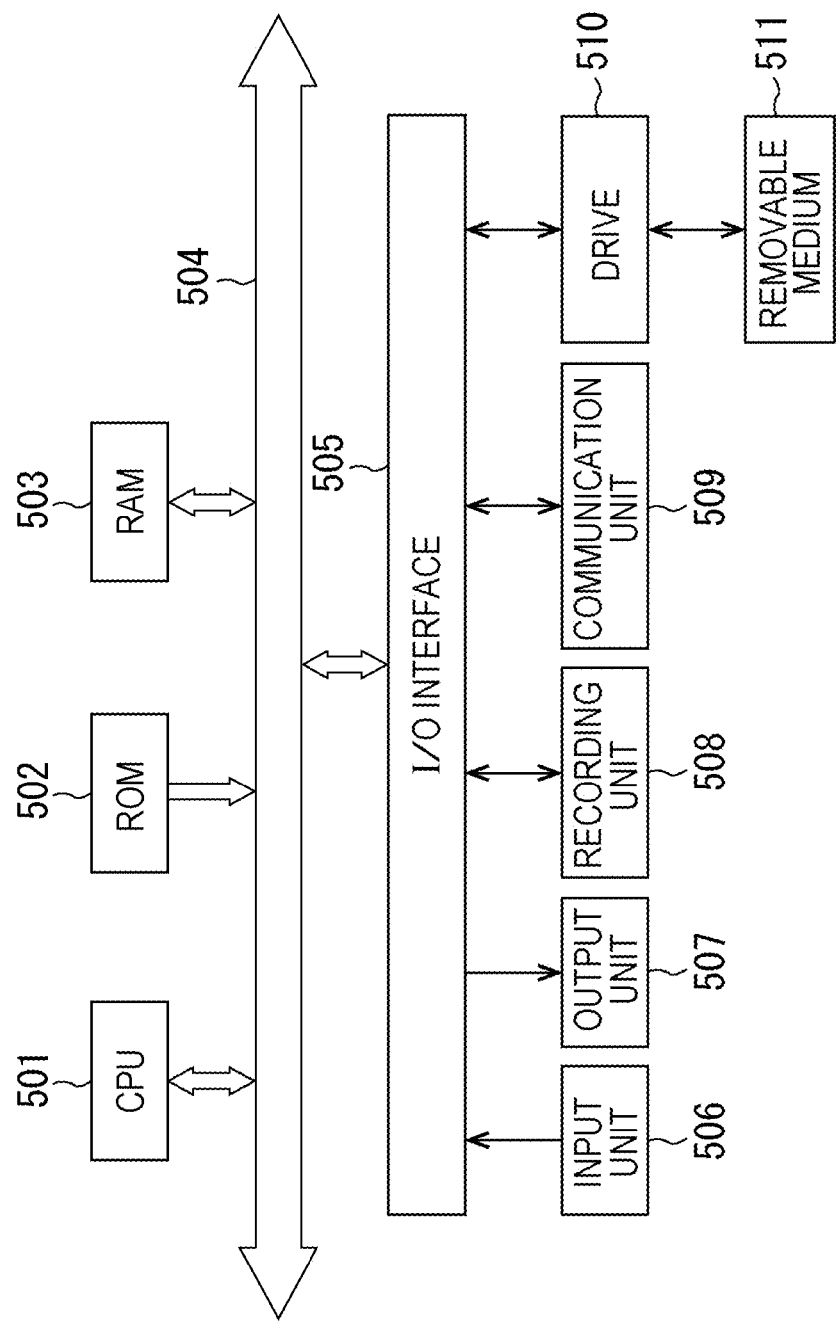

CODING DEVICE AND METHOD, DECODING DEVICE AND METHOD, AND PROGRAM

TECHNICAL FIELD

The present technology relates to a coding device and method, a decoding device and method, and a program, and particularly to a coding device and method, and a decoding device and method, and a program capable of reducing the amount of calculations for decoding audio signals.

BACKGROUND ART

There is known multichannel coding in international standards such as the moving picture experts group (MPEG)-2 advanced audio coding (AAC) standard, the MPEG-4 AAC standard, or the MPEG-D USAC standard as a method for coding audio signals, for example (see Non-Patent Document 1 and Non-Patent Document 2, for example).

CITATION LIST

Non-Patent Documents

Non-Patent Document 1: INTERNATIONAL STANDARD ISO/IEC 14496-3 Fourth edition 2009-09-01 Information technology-coding of audio-visual objects-part 3: Audio
Non-Patent Document 2: INTERNATIONAL STANDARD ISO/IEC 23003-3 First edition 2012-04-01 Information technology-coding of audio-visual objects-part 3: Unified speech and audio coding

SUMMARY OF THE INVENTION

Problems to be Solved by the Invention

Incidentally, there is required a coding technique using more audio channels in order to perform more alive reproduction than conventional 5.1 channel surround reproduction and to transmit a plurality of speeches (dialogs).

For example, it will be assumed that audio signals of 22 channels, and audio signals of a plurality of dialog sources in English, French, German, and the like are coded and transmitted to perform decoding.

In such a case, coded data acquired by the coding is configured of a bit stream of coded data of the 22 channel sources and a bit stream of coded data of the plurality of the dialog sources, and the bit streams are combined to be transmitted in one bit stream of the coded data.

Further, the coded data of the 22 channel sources and the coded data of the plurality of the dialog sources are decoded from the bit stream of the coded data on the decoding side. Thereby, the decoded data of the 22 channel sources and the decoded data of the plurality of the dialog sources are acquired.

Then, only the decoded data of a desired dialog source is selected from the decoded data of the plurality of the dialog sources on the decoding side, and the decoded data of the dialog channel sources in the 22 channel sources is replaced with the decoded data of the selected desired dialog source.

On the other hand, the coded data is transmitted in one bit stream, and thus all the coded data of the dialog sources needs to be decoded although only a desired dialog source is finally required on the decoding side, and the processing for decoding the dialog sources which is not finally reproduced goes to waste.

All the channels and all the dialogs need to be decoded in audio codec such as current AAC or USAC, and thus the amount of calculations for decoding is difficult to reduce.

The present technology has been made in terms of the above situations, and is directed to reduce the amount of calculations for decoding.

Solutions to Problems

A coding device of a first aspect of the present technology includes: a channel source coding unit for coding audio signals of a plurality of channel sources including a dialog source to generate coded data; an additional dialog source coding unit for coding an audio signal of an additional dialog source different from the dialog source to generate coded data; and a multiplexer for multiplexing dialog information including information on the additional dialog source, the coded data of the plurality of the channel sources, and the coded data of the additional dialog source.

The coded data of the additional dialog source and the dialog information can be stored in a user data area in a bit stream acquired by the multiplexing.

The user data area can be assumed as DSE defined in MPEG AAC or MPEG-D USAC.

The dialog information may include information on the dialog source.

The dialog information may include information indicating a type of the additional dialog source, and information indicating a type of the dialog source.

The dialog information may include information indicating a channel of the dialog source among the channels of the audio signals of the plurality of the channel sources in a multichannel configuration.

The dialog information may include gain information for making gain correction of the audio signal of the additional dialog source.

The dialog information may include corrected gain information for making gain correction of the audio signals of a plurality of the additional dialog sources per the plurality of additional dialog sources.

A coding method or program of the first aspect of the present technology includes the steps of: coding audio signals of a plurality of channel sources including a dialog source to generate coded data; coding an audio signal of an additional dialog source different from the dialog source to generate coded data; and multiplexing dialog information including information on the additional dialog source, the coded data of the plurality of the channel sources, and the coded data of the additional dialog source.

According to the first aspect of the present technology, audio signals of a plurality of channel sources including a dialog source are coded to generate coded data, an audio signal of an additional dialog source different from the dialog source is coded to generate coded data, and dialog information including information on the additional dialog source, the coded data of the plurality of the channel sources, and the coded data of the additional dialog source are multiplexed.

A decoding device of a second aspect of the present technology includes: a separating unit for separating a coded bit stream into coded data of a plurality of channel sources including a dialog source, coded data of one or more additional dialog sources different from the dialog source, and dialog information including information on the additional dialog sources; and an additional dialog source decoding unit for decoding the coded data of the additional dialog source selected from among the coded data of the one or more additional dialog sources.

The decoding device can be further provided with a channel source decoding unit for decoding the coded data of the plurality of the channel sources.

The decoding device can be further provided with a dialog selection unit for replacing and outputting an audio signal acquired by decoding the coded data of the dialog source with an audio signal acquired by decoding the coded data of the selected additional dialog source.

The additional dialog source decoding unit can decode the coded data of the additional dialog source selected in response to presentation of the dialog information.

A decoding method or program of the second aspect of the present technology includes the steps of: separating a coded bit stream into coded data of a plurality of channel sources including a dialog source, coded data of one or more additional dialog sources different from the dialog source, and dialog information including information on the additional dialog sources; and decoding the coded data of the additional dialog source selected from among the coded data of the one or more additional dialog sources.

According to the second aspect of the present technology, a coded bit stream is separated into coded data of a plurality of channel sources including a dialog source, coded data of one or more additional dialog sources different from the dialog source, and dialog information including information on the additional dialog sources, and the coded data of the additional dialog source selected from among the coded data of the one or more additional dialog sources is decoded.

Effects of the Invention

According to the first aspect and the second aspect of the present technology, it is possible to reduce the amount of calculations for decoding.

Incidentally, the effects described herein are not necessarily limited, and any effect described in the present disclosure may be obtained.

BRIEF DESCRIPTION OF DRAWINGS

FIG. 3 is a diagram illustrating an exemplary bit stream syntax of dialog information.

FIG. 4 is a diagram illustrating an exemplary bit stream syntax of coded data of an additional dialog source.

FIG. 8 is a diagram illustrating an exemplary configuration of a computer.

MODE FOR CARRYING OUT THE INVENTION

An exemplary embodiment to which the present technology is applied will be described below with reference to the drawings.

First Exemplary Embodiment

<Outline of Present Technology>

The present technology is directed to transmit a bit stream added with dialog information when a bit stream of coded data of a plurality of channel sources and a bit stream of coded data of a plurality of dialog sources are combined to be transmitted in one bit stream of the coded data.

Thereby, only a dialog source to be reproduced as a dialog channel can be decoded, thereby reducing the amount of calculations for decoding.

At this time, the number of additional dialog sources and the information on the additional dialog sources are presented to a viewer on the decoding side and an instruction as to whether to replace the dialog channel sources with a viewer-selected dialog source is received from the viewer, thereby decoding only a dialog source to be reproduced as the dialog channel.

Specifically, according to the present technology, the number of additional dialog sources, the information on the additional dialog sources, and the positions of the dialog channels, and the gains of the additional dialog sources are coded as dialog information on the coding side. Then, the coded data of the dialog information is multiplexed on the coded data of the additional dialog sources and the coded data of the 22 channel sources so that the resultant bit stream is output.

Further, the coded data of the dialog information, the coded data of the additional dialog sources, and the coded data of the 22 channel sources are separated on the decoding side. Further, the number of additional dialog sources or the information on the additional dialog sources is presented to the viewer, and an instruction as to whether to replace the dialog channel sources with a viewer-selected dialog source is made by the viewer.

When such an instruction is made by the viewer, only a dialog source to be reproduced as the dialog channel is decoded and the dialog sources are replaced on the decoding side in response to the viewer's instruction, thereby reproducing the 22 channel sources.

<Reproducing System for 22 Channel Sources>

A more specific exemplary embodiment to which the present technology is applied will be described below. Additionally, the description will be made assuming that audio signals to be reproduced are signals of 22 channels in a multichannel configuration, but audio signals to be reproduced may be signals of any channels.

Figure 1:
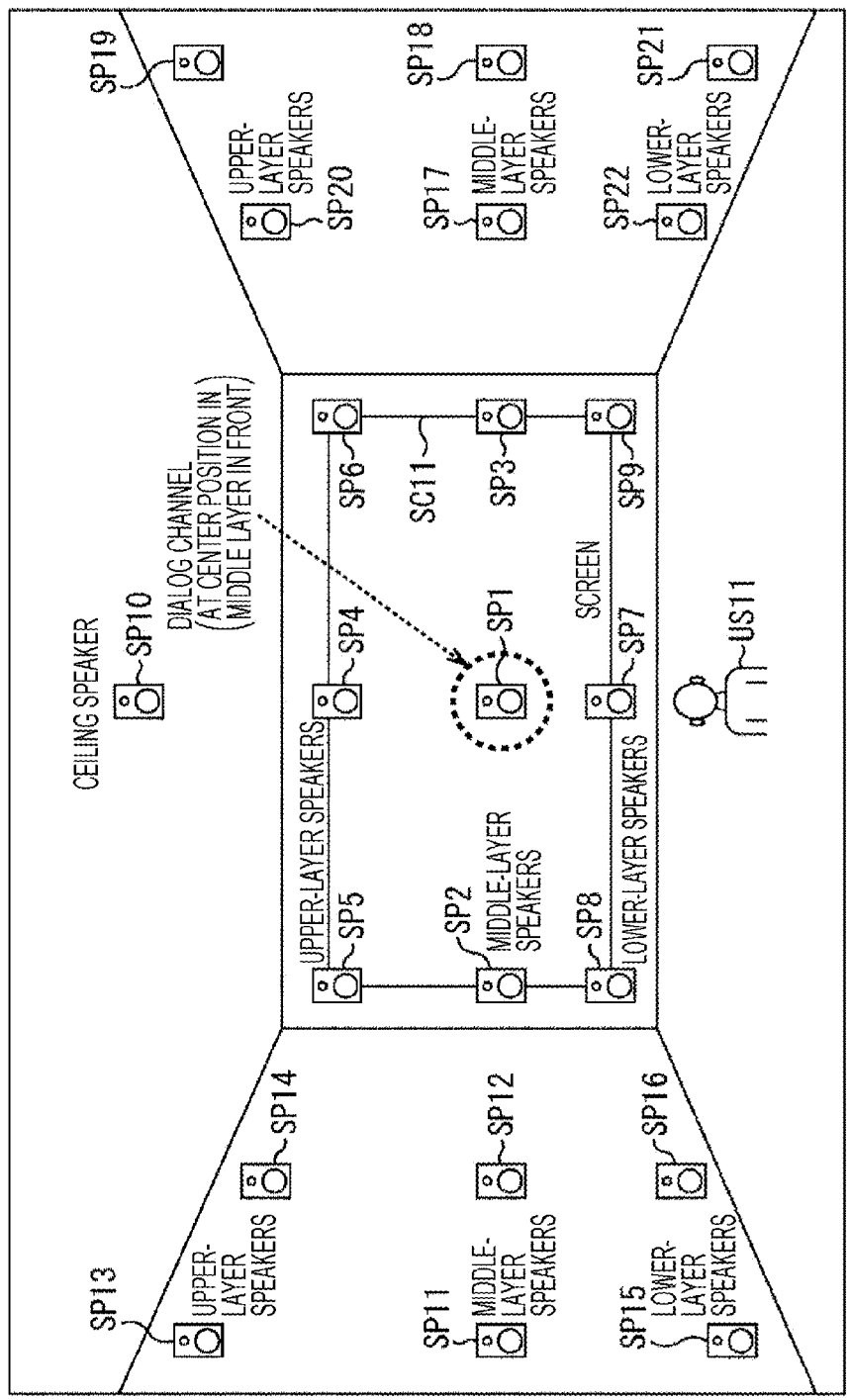
FIG. 1 is a diagram for explaining a reproducing system for 22 channel sources.

FIG. 1 is a diagram illustrating a reproducing system for 22 channel sources capable of reproducing decoded audio signals of 22 channels in a multichannel configuration. In this example, videos of contents and audio signals of 22 channels attached to the videos are reproduced.

In FIG. 1, a screen SC11 for displaying a video thereon is provided in front of a viewer US11, and nine speakers SP1 to SP9 are arranged in front.

That is, the speaker SP1 is arranged on the center in the middle layer of the front relative to the viewer US11, and the speaker SP2 and the speaker SP3 are arranged on the left and right sides of the speaker SP1, respectively. Further, the speaker SP4 is arranged on the center in the upper layer above the middle layer in the Figure, and the speaker SP5 and the speaker SP6 are arranged on the left and right sides of the speaker SP4, respectively.

Similarly, the speaker SP7 is arranged on the center in the lower layer below the middle layer in the Figure, and the speaker SP8 and the speaker SP9 are arranged on the left and right sides of the speaker SP7, respectively. Further, a speaker SP10 is arranged above the viewer US11 in the Figure, or on the ceiling.

Further, six speakers SP11 to SP16 are arranged on the left side positioned left in the Figure relative to the viewer US11. That is, the speaker SP11 and the speaker SP12 are arranged in the middle layer on the left side, the speaker SP13 and the speaker SP14 are arranged in the upper layer on the left side, and the speaker SP15 and the speaker SP16 are arranged in the lower layer on the left side.

Similarly, six speakers SP17 to SP22 are arranged on the right side positioned right in the Figure relative to the viewer US11. That is, the speaker SP17 and the speaker SP18 are arranged in the middle layer on the right side, the speaker SP19 and the speaker SP20 are arranged in the upper layer on the right side, and the speaker SP21 and the speaker SP22 are arranged in the lower layer on the right side.

Coded data of channel sources, coded data of additional dialog sources, and coded data of dialog information are input in the reproducing system for 22 channel sources having the 22 speakers SP1 to SP22 and a decoding device (not illustrated).

Coded data of channel sources, coded data of additional dialog sources, and coded data of dialog information will be described herein.

The coded data of channel sources is data acquired by coding an audio signal of each channel in a multichannel configuration corresponding to the 22 speakers SP1 to SP22. Speech reproduced by an audio signal of each channel will also be denoted as channel source below.

Further, a dialog source as dialog speech is included in the channel sources corresponding to the respective channels. The description will be made assuming one dialog source included in the channel sources, but any number of dialog sources may be employed. Further, a channel of an audio signal for reproducing a dialog source will also be denoted as dialog channel below.

The coded data of additional dialog sources is data acquired by coding audio signals of additional dialog sources as added dialog speeches which are candidates to be replaced with the dialog source. In the reproducing system for 22 channel sources, the dialog source included in the channel sources is replaced with an additional dialog source to be reproduced when the channel sources are reproduced.

The coded data of dialog information is data acquired by coding dialog information including information on the dialog source or the additional dialog sources.

When a bit stream including the coded data of channel sources, the coded data of additional dialog sources, and the coded data of dialog information is supplied to the reproducing system for 22 channel sources, the coded data is decoded as needed and the channel sources are reproduced.

For example, at first, the dialog information acquired by the decoding is presented to the viewer US11. The viewer US11 then instructs to replace with the dialog source as needed. That is, a dialog source to be reproduced is selected from among the dialog source and one or more additional dialog sources.

When a dialog source is selected herein by the viewer US11, for example, only the coded data of the channel sources including the dialog source is decoded. Then, the audio signals of the respective channel sources acquired by the decoding, or the audio signals of the respective channels are supplied to the speakers corresponding to the channels so that the channel sources are reproduced.

At this time, one of the speakers SP1 to SP22 is used as a speaker for reproducing the dialog source. In this example, the dialog source is reproduced in the speaker SP1 on the center in the middle layer in front of the viewer US11.

Incidentally, any speaker for reproducing the dialog source can be designated on the coding side, but the description will be made assuming the speaker SP1 as a speaker for reproducing the dialog source.

On the other hand, when an additional dialog source is selected as a dialog source to be reproduced, the coded data of the channel sources is decoded and the coded data of the selected additional dialog source is also decoded. Then, the audio signal of the dialog source among the audio signals of the channel sources acquired by the decoding is replaced with the audio signal of the selected additional dialog source acquired by the decoding so that the channel sources are reproduced.

Therefore, in this case, the selected additional dialog source is reproduced in the speaker SP1, and the channel sources corresponding to the remaining speakers SP2 to SP22 are reproduced therein. Further, in this case, the coded data of other non-selected additional dialog sources is not decoded.

Additionally, the description will be made herein assuming that a source to be replaced among the channel sources is the dialog source, or dialog speech, but any other source such as an object source may be replaced.

<Exemplary Configuration of Coding Device>

Subsequently, a coding device for generating a bit stream input in the reproducing system for 22 channel sources described above, and a decoding device configuring the reproducing system for 22 channel sources and directed for decoding a bit stream output from the coding device will be described.

Figure 2:
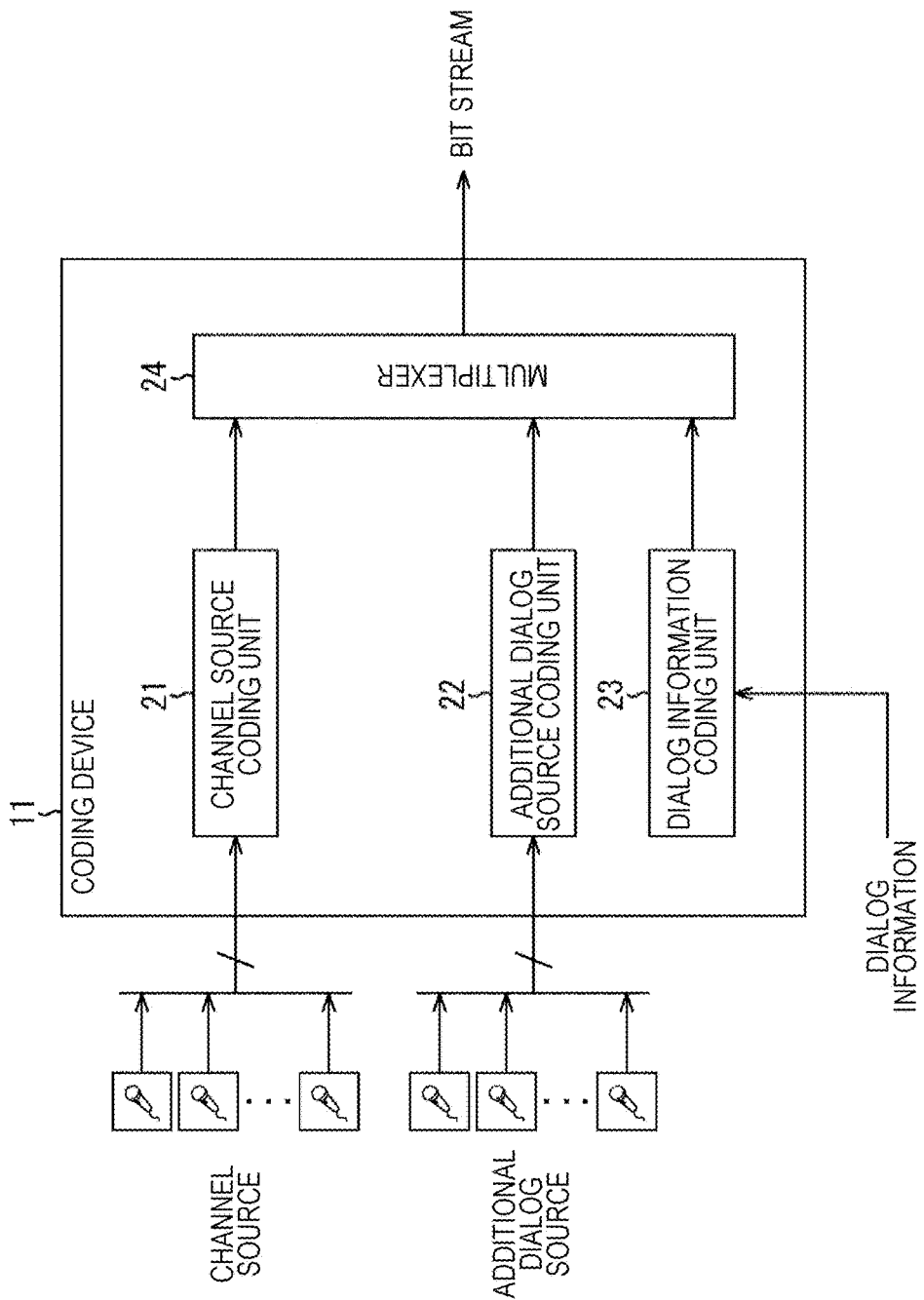
FIG. 2 is a diagram illustrating an exemplary configuration of a coding device.

The coding device will be first described. FIG. 2 is a diagram illustrating an exemplary configuration of one exemplary embodiment of the coding device to which the present technology is applied.

A coding device 11 of FIG. 2 has a channel source coding unit 21, an additional dialog source coding unit 22, a dialog information coding unit 23, and a multiplexer 24.

The channel source coding unit 21 codes a supplied audio signal of each channel source configuring the 22 channels, and supplies the resultant coded data to the multiplexer 24. The additional dialog source coding unit 22 codes a supplied audio signal of an additional dialog source, and supplies the resultant coded data to the multiplexer 24.

The dialog information coding unit 23 codes supplied dialog information, and supplies the resultant coded data to the multiplexer 24. The multiplexer 24 multiplexes the coded data supplied from the channel source coding unit 21, the additional dialog source coding unit 22, and the dialog information coding unit 23 to generate and output a bit stream.

In the coding device 11, the channel sources, the additional dialog sources, and the dialog information are coded in the AAC (MPEG AAC) standard or the USAC (MPEG-D USAC) standard, for example.

<Dialog Information and Additional Dialog Sources>

Incidentally, a bit stream output from the multiplexer 24 is a coded bit stream conforming to the AAC standard or the USAC standard, for example. The coded data of the dialog information is arranged subsequent to the coded data of the channel sources, and the coded data of each additional dialog source is further arranged after them in the bit stream, for example.

Further, the coded data of the dialog information is stored in a user data area of the bit stream, which is freely definable by a user and called bit stream data stream element (DSE) defined in the AAC standard or the USAC standard, for example. Similarly, the coded data of each additional dialog source is also stored in as many DSE as the additional dialog sources subsequent to the DSE storing the coded data of the dialog information therein (which will be denoted as DSE( ) below as needed). That is, the coded data of one additional dialog source is stored in one DSE.

A specific example of a bit stream syntax of coded data of dialog information and coded data of an additional dialog source will be described herein.

FIG. 3 is a diagram illustrating a bit stream syntax of coded data of dialog information.

In this example, dialogue_info_sync, which is a synchronization code indicating the presence of coded dialog information, is arranged at the head of DSE as coded data of the dialog information.

Further, main_dialogue_info, which is information on the dialog source included in the channel sources (which will be denoted as main dialog information), is arranged subsequent to the synchronization code dialogue_info_sync. For example, the main dialog information main_dialogue_info is assumed as information indicating a type of the dialog source such as Japanese main voice or narration voice.

dialogue_src_index is dialog position information indicating a channel of the audio signal of the dialog source included in the channel sources, or a speaker position in which the dialog source is reproduced. Thus, the dialog source or an additional dialog source is reproduced by a speaker specified by the dialog position information dialogue_src_index among the speakers SP1 to SP22.

dialogue_gain indicates a gain value of an additional dialog source on dialog replacement, or gain information for making gain correction when an additional dialog source is reproduced. num_additional_dialogue is additional dialog number information indicating the number of additional dialog sources.

Further, as many additional_dialogue_info[i] and additional_dialogue_gain[i] as indicated by the additional dialog number information num_additional_dialogue are arranged after the additional dialog number information num_additional_dialogue.

additional_dialogue_info[i] is information on an i-th additional dialog source (which will be denoted as additional dialog information).

The additional dialog information additional_dialogue_info[i] is assumed as information indicating a type of an additional dialog source such as French sub-voice, voice for contents explanation, and slowly-spoken narration voice like the main dialog information.

additional_dialogue_gain[i] indicates a corrected gain value for an i-th additional dialog source. The corrected gain value additional_dialogue_gain[i] is gain information for correcting a variation in sound volume among the additional dialog sources.

As described above, the dialog information includes at least the main dialog information, the dialog position information, the gain value of an additional dialog source, the additional dialog number information, the additional dialog information, and the corrected gain value of an additional dialog source.

Further, a bit stream syntax of the coded data of each additional dialog source is as illustrated in FIG. 4, for example.

In this example, a synchronization code additional_dialogue_data_sync, which indicates the presence of a coded audio signal of an additional dialog source, is arranged at the head of DSE as coded data of the additional dialog source.

Further, additional_dialogue_index arranged subsequent to the synchronization code additional_dialogue_data_sync indicates an index for identifying an audio signal (coded data) of an additional dialog source stored in the DSE. Further, single_channel_element( ) arranged subsequent to the index indicates coded data of a single channel defined in AAC or USAC, or a coded audio signal of the additional dialog source.

<Description of Coding Processing>

The operations of the coding device 11 will be described below.

Figure 5:
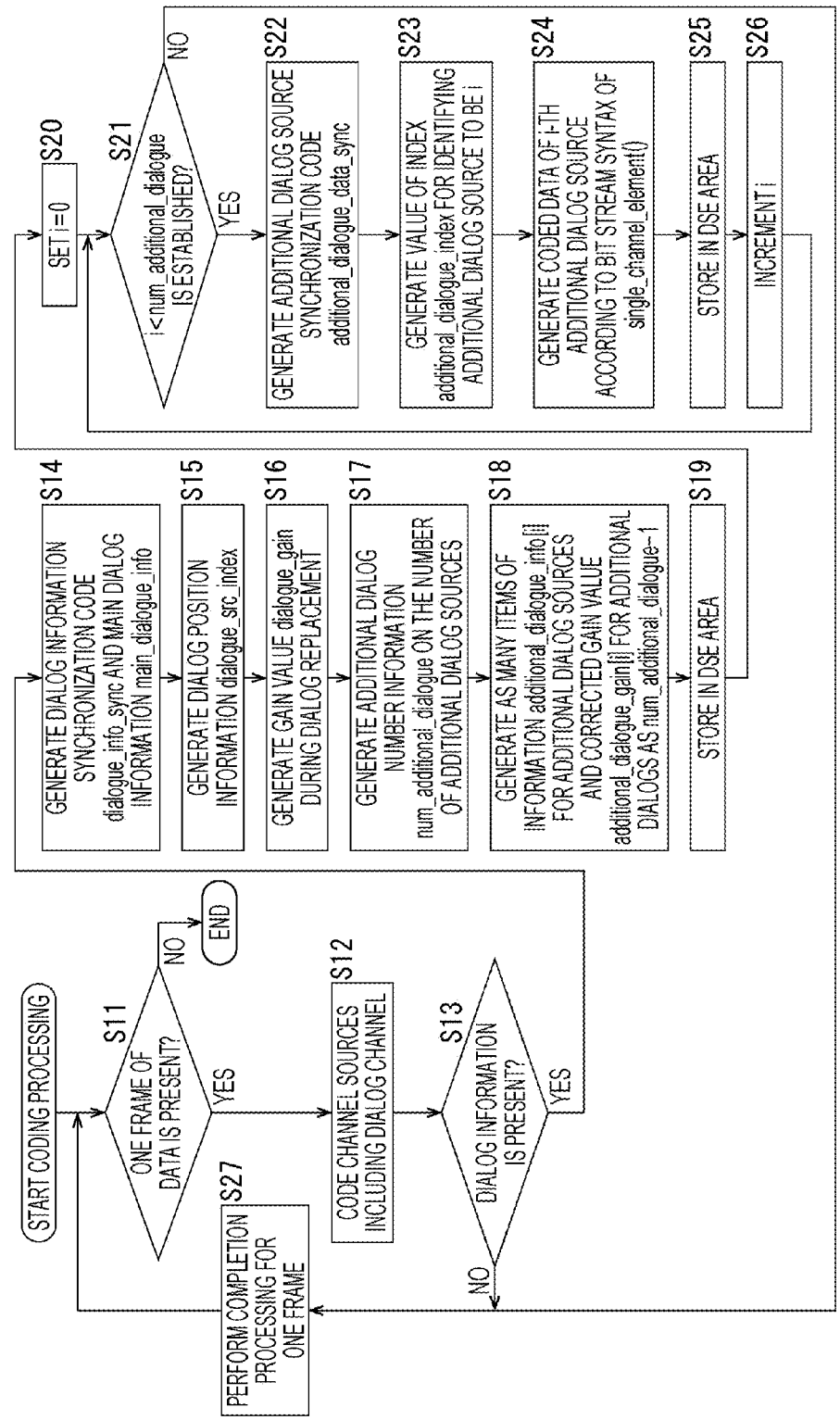
FIG. 5 is a flowchart for explaining coding processing.

When supplied with an audio signal of each frame in the multichannel configuration to be coded, the coding device 11 starts coding processing and outputs a bit stream acquired by the coding. The coding processing in the coding device 11 will be described below with reference to the flowchart of FIG. 5.

In step S11, the coding device 11 determines whether one frame of non-coded data is present.

In step S11, when it is determined that one frame of coded data is present, in step S12, the channel source coding unit 21 codes the audio signals of the channel sources including the dialog channel for the current frame. That is, the channel source coding unit 21 codes a supplied audio signal of each channel source configuring the 22 channels, and supplies the resultant coded data to the multiplexer 24.

In step S13, the dialog information coding unit 23 determines whether dialog information is present. For example, when dialog information of a current frame is supplied from the outside, it is determined that dialog information is present.

In step S13, when it is determined that dialog information is not present, the processing in step S14 to step S26 is not performed and the processing proceeds to step S27. In this case, an additional dialog source is not present, and thus only the coded data of the channel sources is stored in a bit stream.

To the contrary, in step S13, when it is determined that dialog information is present, the processing proceeds to step S14.

In step S14, the dialog information coding unit 23 generates the dialog information synchronization code dialogue_info_sync and the main dialog information main_dialogue_info on the basis of the supplied dialog information.

In step S15, the dialog information coding unit 23 generates the dialog position information dialogue_src_index on the basis of the dialog information.

In step S16, the dialog information coding unit 23 generates the gain value dialogue_gain of an additional dialog source during dialog replacement on the basis of the dialog information.

In step S17, the dialog information coding unit 23 generates the additional dialog number information num_additional_dialogue indicating the number of additional dialog sources on the basis of the dialog information.

In step S18, the dialog information coding unit 23 generates as many items of additional dialog information additional_dialogue_info [i] for additional dialogue sources and corrected gain value additional_dialogue_gain [i] as indicated by the additional dialog number information num_additional_dialogue on the basis of the dialog information. That is, the additional dialog information additional_dialogue_info [i] and the corrected gain value additional_dialogue_gain [i] are generated at i=0 to num_additional_dialogue−1. Thereby, the coded additional dialog information and corrected gain value of each additional dialog source are acquired. Additionally, one or more additional dialog sources may be employed.

In step S19, the dialog information coding unit 23 stores the data generated in step S14 to step S18 in one DSE( ).

That is, the synchronization code dialogue_info_sync, the main dialog information main_dialogue_info, the dialog position information dialogue_src_index, the gain value dialogue_gain, the additional dialog number information num_additional_dialogue, the additional dialog information additional_dialogue_info[i], and the corrected gain value additional_dialogue_gain[i] are stored in DSE. Thereby, the coded data of the dialog information is generated in accordance with the bit stream syntax illustrated in FIG. 3, for example.

The dialog information coding unit 23 supplies the thus-acquired coded data of the dialog information to the multiplexer 24.

In step S20, the additional dialog source coding unit 22 sets a value of the index i indicating a current additional dialog source at i=0. Herein, an additional dialog source specified by the index i indicates an i-th current additional dialog source. Herein, the number of additional dialog sources is num_additional_dialogue, and thus the additional dialog sources at the index i=0 to num_additional_dialogue−1 may be processed.

In step S21, the additional dialog source coding unit 22 determines whether a value of the index i is at i<num_additional_dialogue.

That is, when i<num_additional_dialogue is established, all the additional dialog sources are not processed. In step S21, when it is determined that i<num_additional_dialogue is established, the processing proceeds to step S22.

In step S22, the additional dialog source coding unit 22 generates the additional dialog source synchronization code additional_dialogue_data_sync.

In step S23, the additional dialog source coding unit 22 generates the index i to be a value of the index additional_dialogue_index for identifying a current additional dialog source. That is, the value of the index i is set as the value of the index additional_dialogue_index.

In step S24, the additional dialog source coding unit 22 generates coded data of an i-th additional dialog source in accordance with the bit stream syntax of single_channel_element( ) defined in AAC or USAC. That is, the additional dialog source coding unit 22 codes an audio signal of an i-th additional dialog source supplied from the outside.

In step S25, the additional dialog source coding unit 22 stores the data generated in the processing in step S22 to step S24 in one DSE( ).

That is, the synchronization code additional_dialogue_data_sync, the index additional_dialogue_index, and the coded audio signal of the additional dialog source are stored in DSE. Thereby, the coded data of the additional dialog source is generated in accordance with the bit stream syntax illustrated in FIG. 4, for example.

In step S26, the additional dialog source coding unit 22 increments the value of the index i by one, and then the processing returns to step S21 and the above processing is repeatedly performed.

Further, in step S21, when it is determined that i<num_additional_dialogue is not established, all the additional dialog sources are coded, and thus the additional dialog source coding unit 22 supplies the coded data of each additional dialog source acquired by the coding to the multiplexer 24, and the processing proceeds to step S27.

In step S21, when it is determined that i<num_additional_dialogue is not established, or in step S13, when it is determined that dialog information is not present, in step S27, the multiplexer 24 performs processing of completing one frame.

That is, the multiplexer 24 multiplexes the coded data supplied from the channel source coding unit 21, the additional dialog source coding unit 22, and the dialog information coding unit 23 to generate and output a bit stream for one frame.

In step S27, when a bit stream for one frame is output, the processing returns to step S11 and the above processing is repeatedly performed. Then, in step S11, when it is determined that one frame of data to be coded is not present, the coding processing ends.

As described above, the coding device 11 codes not only the audio signals of the channel sources and the additional dialog sources but also the dialog information including the information on the dialog source among the channel sources and the additional dialog sources, and multiplexes and outputs the coded data.

In this way, the dialog information is coded and included in a bit stream to be transmitted, and thus only the coded data of a required additional dialog source can be decoded on the decoding side, thereby reducing the amount of calculations during decoding.

<Exemplary Configuration of Decoding Device>

Figure 6:
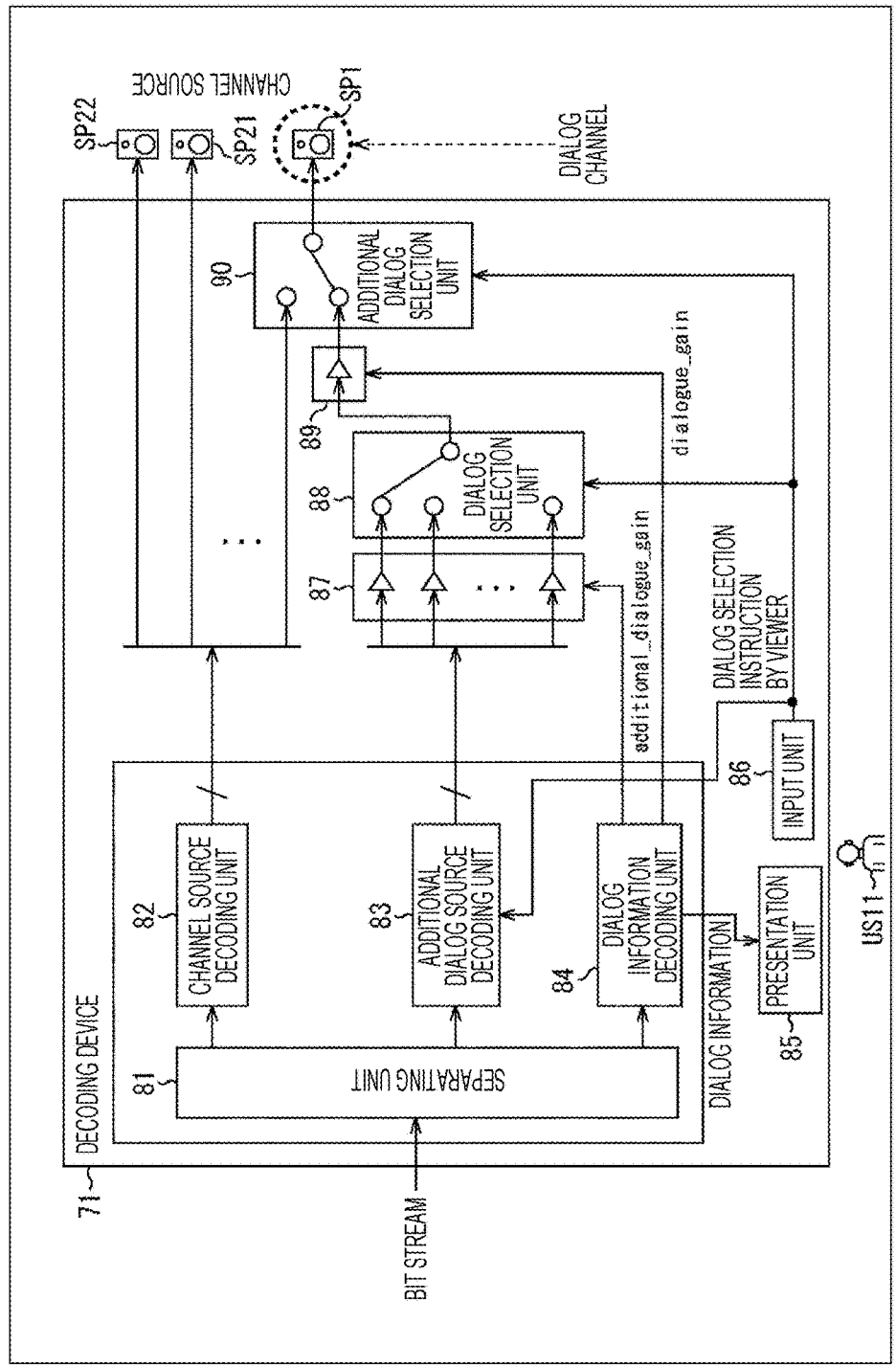
FIG. 6 is a diagram illustrating an exemplary configuration of a decoding device.

The decoding device for decoding coded data included in a bit stream in response to the input bit stream output from the coding device 11 will be described below. The decoding device is configured as illustrated in FIG. 6, for example. Additionally, the parts corresponding to those in FIG. 1 are denoted with the same reference numerals in FIG. 6, and the description thereof will be omitted as needed.

A decoding device 71 illustrated in FIG. 6 has a separating unit 81, a channel source decoding unit 82, an additional dialog source decoding unit 83, a dialog information decoding unit 84, a presentation unit 85, an input unit 86, a gain correction unit 87, a dialog selection unit 88, a gain correction unit 89, and an additional dialog selection unit 90.

The separating unit 81 separates an input bit stream into the coded data of the channel sources, the coded data of the additional dialog sources, and the coded data of the dialog information. The separating unit 81 supplies the channel source decoding unit 82 with the coded data of the channel sources, supplies the additional dialog source decoding unit 83 with the coded data of the additional dialog sources, and supplies the dialog information decoding unit 84 with the coded data of the dialog information.

The channel source decoding unit 82 decodes the coded data of each channel source supplied from the separating unit 81, supplies the resultant audio signal of the dialog channel to the additional dialog selection unit 90, and supplies the audio signals of other channel sources to the speakers SP2 to SP22 corresponding to the channel sources.

The additional dialog source decoding unit 83 decodes only the coded data of an additional dialog source indicated by a selection instruction supplied from the input unit 86 among the coded data of the additional dialog sources supplied from the separating unit 81, and supplies it to the gain correction unit 87.

The dialog information decoding unit 84 decodes the coded data of the dialog information supplied from the separating unit 81, and supplies the presentation unit 85 with the resultant dialog information. Further, the dialog information decoding unit 84 supplies the gain correction unit 89 with the gain value dialogue_gain of the dialog information acquired by the decoding, and supplies the gain correction unit 87 with the corrected gain value additional_dialogue_gain [i] of the dialog information.

The presentation unit 84 presents the dialog information supplied from the dialog information decoding unit 84 to the viewer US11. The input unit 86 supplies a selection instruction indicating a signal in response to an input operation by the viewer US11, or the dialog source or an additional dialog source selected by the viewer US11 to the additional dialog source decoding unit 83, the dialog selection unit 88, and the additional dialog selection unit 90.

The gain correction unit 87 makes gain correction of the audio signals of the additional dialog sources supplied from the additional dialog source decoding unit 83 on the basis of the corrected gain value additional_dialogue_gain [i] supplied from the dialog information decoding unit 84, and supplies the gain-corrected audio signals to the dialog selection unit 88. More specifically, the gain correction unit 87 has an amplifier corresponding to each additional dialog source, and each amplifier multiplies an audio signal of an additional dialog source supplied from the additional dialog source decoding unit 83 by the corrected gain value corresponding to the additional dialog source for output.

The dialog selection unit 88 selects one of the audio signals of the additional dialog sources supplied from the gain correction unit 87 on the basis of the selection instruction supplied from the input unit 86, and supplies it to the gain correction unit 89. More specifically, the dialog selection unit 88 is configured of a switch, for example, and connects the output terminal of the switch to one of the output terminals of the amplifiers corresponding to the additional dialog sources in the gain correction unit 87 in accordance with the selection instruction from the input unit 86. Thereby, only an audio signal of an additional dialog source indicated by the selection instruction is output from the output terminal of the switch to the gain correction unit 89.

The gain correction unit 89 makes gain correction of the audio signal of the additional dialog source supplied from the dialog selection unit 88 on the basis of the gain value dialogue_gain supplied from the dialog information decoding unit 84, and supplies the gain-corrected audio signal to the additional dialog selection unit 90. The additional dialog selection unit 90 is configured of a switch, for example, and selects either the audio signal of the dialog source supplied from the channel source decoding unit 82 or the audio signal of the additional dialog source supplied from the gain correction unit 89 on the basis of the selection instruction supplied from the input unit 86, and supplies it to the speaker SP1.

Additionally, the description is made herein assuming that the decoding device 71 has the separating unit 81 to the additional dialog selection unit 90, but only the separating unit 81 to the dialog information decoding unit 84 may be provided in the decoding device 71, and the presentation unit 85 to the additional dialog selection unit 90 may be provided outside the decoding device 71.

<Description of Decoding Processing>

Subsequently, the operations of the decoding device 71 will be described.

Figure 7:
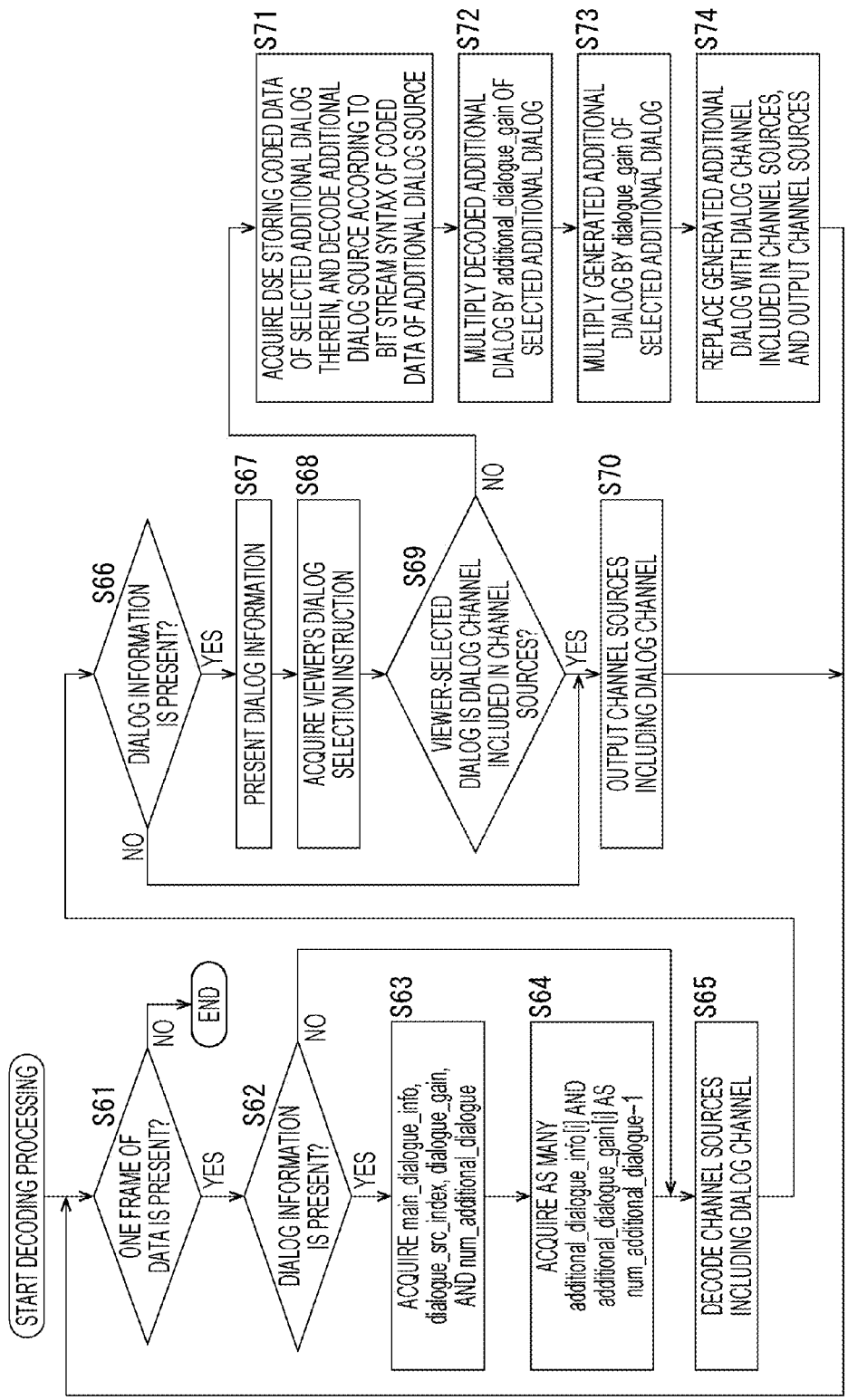
FIG. 7 is a flowchart for explaining decoding processing.

When supplied with a bit stream transmitted from the coding device 11, the decoding device 71 starts decoding processing and reproduces the channel sources acquired by the decoding. The decoding processing in the decoding device 71 will be described below with reference to the flowchart of FIG. 7.

In step S61, the separating unit 81 determines whether one frame of non-processed data is present in the supplied bit stream.

In step S61, when it is determined that one frame of data is present, in step S62, the separating unit 81 determines whether dialog information is included in the bit stream for one frame.

For example, when DSE( ) storing the synchronization code dialogue_info_sync therein is present in DSE( ) configuring the bit stream, it is determined that dialog information is included.

In step S62, when it is determined that dialog information is not included, dialog information is not present, and thus the processing in step S63 and step S64 is not performed and the processing proceeds to step S65. At this time, the separating unit 81 separates the coded data of the channel sources from the bit stream, and supplies it to the channel source decoding unit 82.

To the contrary, in step S62, when it is determined that dialog information is included, the processing proceeds to step S63. At this time, the separating unit 81 separates the coded data of the channel sources from the bit stream and supplies it to the channel source decoding unit 82, and separates the coded data of the dialog information from the bit stream and supplies it to the dialog information decoding unit 84.

In step S63, the dialog information decoding unit 84 acquires the main dialog information main_dialogue_info, the dialog position information dialogue_src_index, the gain value dialogue_gain, and the additional dialog number information num_additional_dialogue from the coded data supplied from the separating unit 81. Further, the dialog information decoding unit 84 supplies the acquired gain value dialogue_gain to the gain correction unit 89.

In step S64, the dialog information decoding unit 84 acquires as many items of additional dialog information additional_dialogue_info[i] and corrected gain value additional_dialogue_gain[i] as indicated by the additional dialog number information num_additional_dialogue from the coded data supplied from the separating unit 81. That is, as many items of additional dialog information additional_dialogue_info[i] and corrected gain value additional_dialogue_gain[i] as the index i=0 to num_additional_dialogue−1 are acquired.

The dialog information decoding unit 84 supplies the gain correction unit 87 with the acquired corrected gain value additional_dialogue_gain[i], and the processing proceeds to step S65.

Through the processing in step S63 and step S64 described above, the dialog information is decoded in accordance with the bit stream syntax illustrated in FIG. 3, for example.

In step S62, when it is determined that dialog information is not included, or in step S64, when the additional dialog information and the corrected gain value are acquired, the processing in step S65 is performed.

In step S65, the channel source decoding unit 82 decodes each channel of the channel sources including the dialog channel. That is, the channel source decoding unit 82 decodes the coded data of the channel sources supplied from the separating unit 81, and outputs the resultant audio signal of each channel source. At this time, the audio signal of the dialog channel, or the dialog source is supplied to the additional dialog selection unit 90, and the audio signals of other channels or the channel sources except the dialog source are supplied to the speakers corresponding to the channel sources.

In step S66, the dialog information decoding unit 84 determines whether dialog information is present. For example, when DSE( ) storing the synchronization code dialogue_info_sync therein is present in the bit stream, or when the dialog information is decoded in step S63 and step S64, it is determined that dialog information is present.

In step S66, when it is determined that dialog information is not present, the processing in step S67 to step S69 is not performed, and the processing proceeds to step S70.

To the contrary, in step S66, when it is determined that dialog information is present, the dialog information decoding unit 84 supplies the presentation unit 85 with the dialog information acquired by the decoding, and the processing proceeds to step S67.

In step S67, the presentation unit 85 presents the dialog information supplied from the dialog information decoding unit 84 to the viewer US11.

For example, at least the main dialog information, the additional dialog number information, and the additional dialog information in the dialog information are presented. The viewer US11 confirms the presented dialog information, and selects one dialog to be reproduced from among the dialog source and some additional dialog sources. The viewer US11 then operates the input unit 86 depending on his/her selection, and makes a dialog selection instruction.

In step S68, the input unit 86 acquires the dialog selection instruction by the viewer US11. The input unit 86 then supplies the selection instruction depending on the operation by the viewer US11 to the additional dialog source decoding unit 83, the dialog selection unit 88, and the additional dialog selection unit 90.

In step S69, the additional dialog source decoding unit 83, the dialog selection unit 88, and the additional dialog selection unit 90 determine whether the dialog selected by the viewer US11 is of the dialog source of the dialog channel included in the channel sources on the basis of the selection instruction supplied from the input unit 86.

In step S69, when it is determined that the dialog is of the dialog source of the dialog channel included in the channel sources, or when an instruction to switch to an additional dialog source is not made, the processing proceeds to step S70. At this time, the additional dialog source decoding unit 83 does not decode an additional dialog source.

In step S69, when it is determined that the dialog is of the dialog source of the dialog channel included in the channel sources, or in step S66, when dialog information is not present, the processing in step S70 is performed.

In step S70, the decoding device 71 outputs the channel sources including the dialog source of the dialog channel.

That is, the additional dialog selection unit 90 supplies the speaker SP1 with the audio signal of the dialog channel supplied from the channel source decoding unit 82 and reproduces the dialog source on the basis of the selection instruction supplied from the input unit 86. Further, the speaker SP2 to the speaker SP22 reproduce each channel source on the basis of the audio signals supplied from the channel source decoding unit 82.

When the channel sources for one frame are reproduced in this way, the processing returns to step S61, and the above processing is repeatedly performed.

To the contrary, in step S69, when it is determined that the dialog is not of the dialog source of the dialog channel included in the channel sources, or when it is determined that the dialog is of an additional dialog source, the processing proceeds to step S71.

In step S71, the additional dialog source decoding unit 83 acquires DSE( ) storing the coded data of the selected additional dialog source therein from the separating unit 81 on the basis of the selection instruction supplied from the input unit 86, and decodes the additional dialog source in accordance with the bit stream syntax of the coded data of the additional dialog source illustrated in FIG. 4, for example.

Through the processing, only the coded data of the additional dialog source indicated by the selection instruction is decoded. The additional dialog source decoding unit 83 supplies the gain correction unit 87 with the audio signal of the additional dialog source acquired by the decoding.

In step S72, the gain correction unit 87 multiplies the audio signal of the additional dialog source supplied from the additional dialog source decoding unit 83 by the corrected gain value additional_dialogue_gain[i] of the additional dialog source indicated by the selection instruction supplied from the dialog information decoding unit 84, thereby making gain correction.

The gain correction unit 87 supplies the dialog selection unit 88 with the gain-corrected audio signal of the additional dialog source. Further, the dialog selection unit 88 switches a connection destination of the switch on the basis of the selection instruction supplied from the input unit 86. Thereby, the audio signal of the additional dialog source indicated by the selection instruction, which is supplied from the gain correction unit 87, is supplied to the gain correction unit 89.

In step S73, the gain correction unit 89 multiplies the audio signal of the additional dialog source supplied from the dialog selection unit 88 by the gain value dialogue_gain supplied from the dialog information decoding unit 84 to make gain correction, and supplies the resultant value to the additional dialog selection unit 90.

In step S74, the additional dialog selection unit 90 replaces and outputs the audio signal of the dialog channel, or the dialog source supplied from the channel source decoding unit 82 with the audio signal of the additional dialog source supplied from the gain correction unit 89 on the basis of the selection instruction supplied from the input unit 86.

In this case, the selection instruction indicates the selected additional dialog source, and thus the additional dialog selection unit 90 supplies the speaker SP1 with the audio signal of the additional dialog source supplied from the gain correction unit 89 to reproduce the additional dialog source. Further, the speaker SP2 to the speaker SP22 reproduce each channel source on the basis of the audio signals supplied from the channel source decoding unit 82.

Thereby, the channel sources are reproduced in the speaker SP2 to the speaker SP22, and the additional dialog source is reproduced in the speaker SP1 instead of the dialog source as channel source.

When the channel sources for one frame are reproduced in this way, the processing returns to step S61, and the above processing is repeatedly performed.

Further, after the channel sources are reproduced in step S70 or step S74, in step S61, when it is determined that one frame of data is not present, the decoding processing ends.

As described above, the decoding device 71 acquires and decodes the coded data of the dialog information from the bit stream, presents the dialog information, and decodes the channel sources and the required additional dialog sources in response to the selection instruction of the viewer US11.

The dialog information is decoded in this way so that the dialog information can be presented, and only the required additional dialog sources are decoded in response to the selection instruction made in accordance with the presentation of the dialog information, thereby reducing the amount of calculations for decoding.

Additionally, the description has been made assuming that a channel to be replaced, or a speaker position where the dialog source is reproduced by the audio signal of the dialog channel is the speaker SP1. However, the dialog information includes the dialog position information dialogue_src_index, and thus any speaker position as a position of a speaker for reproducing the dialog source can be designated per frame.

In such a case, a speaker position to be replaced, or a channel source to be replaced is specified on the basis of the dialog position information dialogue_src_index. Then, a selection is made for the specified channel source as to whether the audio signal of the channel source is output or the audio signal of the channel source is replaced with an audio signal of a selected additional source in response to the selection instruction of the viewer US11.

Incidentally, a series of processing described above may be performed in hardware or in software. When the series of processing is performed in software, the programs configuring the software are installed in a computer. Herein, the computer may be a computer incorporated in dedicated hardware, a general-purpose personal computer capable of performing various functions by installing various programs therein, or the like.

FIG. 8 is a block diagram illustrating an exemplary hardware configuration of a computer for performing the series of processing by the programs.

In the computer, a central processing unit (CPU) 501, a read only memory (ROM) 502, and a random access memory (RAM) 503 are mutually connected via a bus 504.

The bus 504 is further connected with an I/O interface 505. The I/O interface 505 is connected with an input unit 506, an output unit 507, a recording unit 508, a communication unit 509, and a drive 510.

The input unit 506 is configured of a keyboard, mouse, microphone, imaging device, or the like. The output unit 507 is configured of a display, speaker, or the like. The recording unit 508 is configured of a hard disc, nonvolatile memory, or the like. The communication unit 509 is configured of a network interface or the like. The drive 510 drives a removable medium 511 such as magnetic disc, optical disc, magnetooptical disk, or semiconductor memory.

In the thus-configured computer, the CPU 501 loads and executes the programs recorded in the recording unit 508 into the RAM 503 via the I/O interface 505 and the bus 504, for example, so that the series of processing described above is performed.

The programs executed by the computer (the CPU 501) can be recorded in the removable medium 511 as a package medium to be provided, for example. Further, the programs can be provided via a wired or wireless transmission medium such as local area network, Internet, or digital satellite broadcasting.

In the computer, the removable medium 511 is mounted on the drive 510 so that the programs can be installed in the recording unit 508 via the I/O interface 505. Further, the programs can be received by the communication unit 509 and installed in the recording unit 508 via a wired or wireless transmission medium. Additionally, the programs can be previously installed in the ROM 502 or the recording unit 508.

Additionally, the programs executed by the computer may be such that the series of the processing is performed in time series in the order described in the specification, or such that the series of the processing is performed in parallel or at necessary timings such as on calling.

Further, embodiments of the present technology are not limited to the above embodiment, and may be variously changed without departing from the spirit of the present technology.

For example, the present technology can take a cloud computing configuration in which one function is distributed and processed in a plurality of devices via a network.

Further, each step described in the flowcharts can be performed in one device, and can be distributed and performed in a plurality of devices.

Further, when multiple kinds of processing are included in one step, the multiple kinds of the processing included in the step can be performed in one device, and can be distributed and performed in a plurality of devices.

Further, the present technology can take the following configurations.

[1]
A coding device including:
a channel source coding unit for coding audio signals of a plurality of channel sources including a dialog source to generate coded data;
an additional dialog source coding unit for coding an audio signal of an additional dialog source different from the dialog source to generate coded data; and
a multiplexer for multiplexing dialog information including information on the additional dialog source, the coded data of the plurality of the channel sources, and the coded data of the additional dialog source.

[2]
The coding device according to [1],
wherein the coded data of the additional dialog source and the dialog information are stored in a user data area in a bit stream acquired by the multiplexing.

[3]
The coding device according to [2],
wherein the user data area is DSE defined in MPEG AAC or MPEG-D USAC.

[4]
The coding device according to any one of [1] to [3],
wherein the dialog information includes information on the dialog source.

[5]
The coding device according to [4],
wherein the dialog information includes information indicating a type of the additional dialog source, and information indicating a type of the dialog source.

[6]
The coding device according to [4] or [5],
wherein the dialog information includes information indicating a channel of the dialog source among the channels of the audio signals of the plurality of the channel sources in a multichannel configuration.

[7]
The coding device according to any one of [1] to [6],
wherein the dialog information includes gain information for making gain correction of the audio signal of the additional dialog source.

[8]
The coding device according to any one of [1] to [7],
wherein the dialog information includes corrected gain information for making gain correction of the audio signals of a plurality of the additional dialog sources per the plurality of additional dialog sources.

[9]
A coding method including the steps of:
coding audio signals of a plurality of channel sources including a dialog source to generate coded data;
coding an audio signal of an additional dialog source different from the dialog source to generate coded data; and multiplexing dialog information including information on the additional dialog source, the coded data of the plurality of the channel sources, and the coded data of the additional dialog source.

[10]

A program for causing a computer to perform processing including the steps of:

coding audio signals of a plurality of channel sources including a dialog source to generate coded data;

coding an audio signal of an additional dialog source different from the dialog source to generate coded data; and multiplexing dialog information including information on the additional dialog source, the coded data of the plurality of the channel sources, and the coded data of the additional dialog source.

[11]

A decoding device including:

a separating unit for separating a coded bit stream into coded data of a plurality of channel sources including a dialog source, coded data of one or more additional dialog sources different from the dialog source, and dialog information including information on the additional dialog sources; and an additional dialog source decoding unit for decoding the coded data of the additional dialog source selected from among the coded data of the one or more additional dialog sources.

[12]

The decoding device according to [11], further including:

a channel source decoding unit for decoding the coded data of the plurality of the channel sources.

[13]

The decoding device according to [11] or [12], further including:

a dialog selection unit for replacing and outputting an audio signal acquired by decoding the coded data of the dialog source with an audio signal acquired by decoding the coded data of the selected additional dialog source.

[14]

The decoding device according to any one of [11] to [13], wherein the additional dialog source decoding unit decodes the coded data of the additional dialog source selected in response to presentation of the dialog information.

[15]

A decoding method including the steps of:

separating a coded bit stream into coded data of a plurality of channel sources including a dialog source, coded data of one or more additional dialog sources different from the dialog source, and dialog information including information on the additional dialog sources; and decoding the coded data of the additional dialog source selected from among the coded data of the one or more additional dialog sources.

[16]

A program for causing a computer to perform processing including the steps of:

separating a coded bit stream into coded data of a plurality of channel sources including a dialog source, coded data of one or more additional dialog sources different from the dialog source, and dialog information including information on the additional dialog sources; and decoding the coded data of the additional dialog source selected from among the coded data of the one or more additional dialog sources.

REFERENCE SIGNS LIST

11 Coding device
21 Channel source coding unit
22 Additional dialog source coding unit
23 Dialog information coding unit
24 Multiplexer
71 Decoding device
81 Separating unit
82 Channel source decoding unit
83 Additional dialog source decoding unit
84 Dialog information decoding unit
85 Presentation unit
86 Input unit
87 Gain correction unit
88 Dialog selection unit
89 Gain correction unit
90 Additional dialog selection unit

The invention claimed is:

1. A coding device comprising:
processing circuitry configured to:
code audio signals of a plurality of channel sources including a dialog source to generate coded data;
code an audio signal of an additional dialog source different from the dialog source to generate coded data; and
multiplex dialog information including information on the additional dialog source, the coded data of the plurality of the channel sources, and the coded data of the additional dialog source.

2. The coding device according to claim 1,
wherein the coded data of the additional dialog source and the dialog information are stored in a user data area in a bit stream acquired by the multiplexing.

3. The coding device according to claim 2,
wherein the user data area is a data stream element (DSE) defined in MPEG AAC or MPEG-D USAC.

4. The coding device according to claim 1,
wherein the dialog information includes information on the dialog source.

5. The coding device according to claim 4,
wherein the dialog information includes information indicating a type of the additional dialog source, and information indicating a type of the dialog source.

6. The coding device according to claim 4,
wherein the dialog information includes information indicating a channel of the dialog source among the channels of the audio signals of the plurality of the channel sources in a multichannel configuration.

7. The coding device according to claim 1,
wherein the dialog information includes gain information for making gain correction of the audio signal of the additional dialog source.

8. The coding device according to claim 1,
wherein the dialog information includes corrected gain information for making gain correction of audio signals of a plurality of additional dialog sources.

9. A coding method including the steps of:
coding audio signals of a plurality of channel sources including a dialog source to generate coded data;
coding an audio signal of an additional dialog source different from the dialog source to generate coded data; and
multiplexing dialog information including information on the additional dialog source, the coded data of the plurality of the channel sources, and the coded data of the additional dialog source.

10. A non-transitory computer readable medium storing a program for causing a computer to perform processing including the steps of:

coding audio signals of a plurality of channel sources including a dialog source to generate coded data;

coding an audio signal of an additional dialog source different from the dialog source to generate coded data; and multiplexing dialog information including information on the additional dialog source, the coded data of the plurality of the channel sources, and the coded data of the additional dialog source.

11. A decoding device comprising:

processing circuitry configured to:

separate a coded bit stream into coded data of a plurality of channel sources including a dialog source, coded data of one or more additional dialog sources different from the dialog source, and dialog information including information on the one or more additional dialog sources;

select, based on user input, an additional dialog source from among the one or more additional dialog sources; and decode the coded data of the additional dialog source selected from among the coded data of the one or more additional dialog sources.

12. The decoding device according to claim 11, wherein the processing circuitry is further configured to decode the coded data of the plurality of the channel sources.

13. The decoding device according to claim 11, wherein the processing circuitry is further configured to replace an audio signal acquired by decoding the coded data of the dialog source with an audio signal acquired by decoding the coded data of the selected additional dialog source, and output the audio signal acquired by decoding the coded data of the selected additional dialog source.

14. The decoding device according to claim 11, wherein the processing circuitry decodes the ceded data of the additional dialog source selected in response to presentation of the dialog information.

15. A decoding method including the steps of:

separating a coded bit stream into coded data of a plurality of channel sources including a dialog source, coded data of one or more additional dialog sources different from the dialog source, and dialog information including information on the one or more additional dialog sources;

selecting, based on user input, an additional dialog source from among the one or more additional dialog sources; and decoding the coded data of the additional dialog source selected from among the coded data of the one or more additional dialog sources.

16. A non-transitory computer readable medium storing a program for causing a computer to perform processing including the steps of:

separating a coded bit stream into coded data of a plurality of channel sources including a dialog source, coded data of one or more additional dialog sources different from the dialog source, and dialog information including information on the one or more additional dialog sources;

selecting, based on user input, an additional dialog source from among the one or more additional dialog sources; and decoding the coded data of the additional dialog source selected from among the coded data of the one or more additional dialog sources.

\* \* \* \* \*